United States Patent
Katoh et al.

(10) Patent No.: US 6,846,518 B2
(45) Date of Patent: Jan. 25, 2005

(54) CONTINUOUS PRODUCTION METHOD OF WATER-ABSORBING COMPOSITE

(75) Inventors: Kouji Katoh, Yokkaichi (JP); Kiichi Itoh, Yokkaichi (JP); Yoshiaki Mori, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 289 days.

(21) Appl. No.: 09/953,258

(22) Filed: Sep. 17, 2001

(65) Prior Publication Data

US 2002/0053754 A1 May 9, 2002

Related U.S. Application Data

(63) Continuation-in-part of application No. PCT/JP00/01601, filed on Mar. 16, 2000.

(30) Foreign Application Priority Data

Mar. 16, 1999 (JP) ............................................. 11-069837

(51) Int. Cl.$^7$ ................................................. B05D 3/04
(52) U.S. Cl. ........................ 427/337; 427/180; 427/288; 427/340; 427/389.9; 427/421; 427/487; 442/118; 442/417
(58) Field of Search ................................. 427/337, 340, 427/180, 288, 421, 487, 389.9; 442/118, 417

(56) References Cited

U.S. PATENT DOCUMENTS

| 4,738,867 A | * | 4/1988 | Itoh et al. | 427/498 |
| 4,865,886 A | * | 9/1989 | Itoh et al. | 427/342 |
| 4,920,202 A | * | 4/1990 | Irie et al. | 528/500 |
| 5,962,068 A |   | 10/1999 | Tsuchiya et al. | 427/180 |

FOREIGN PATENT DOCUMENTS

| EP | 0 262 405 | 4/1988 | |
| EP | 0 712 659 | 5/1996 | |
| EP | 1 142 696 | 10/2001 | |
| JP | 9-137072 | 5/1987 | |
| JP | 3-27181 | 2/1991 | |
| JP | 8-13342 | 1/1996 | |
| JP | 763364 | 3/1997 | |
| JP | 9-67403 | 3/1997 | |
| JP | 09067403 | * 3/1997 | ............. C08F/2/00 |
| JP | 9-156013 | 6/1997 | |
| JP | 9-239912 | 9/1997 | |
| JP | 9-255704 | 9/1997 | |
| JP | 10-76589 A | 3/1998 | |
| JP | 10-113556 | 5/1998 | |
| JP | 10-259575 | 9/1998 | |
| JP | 11-93073 | 4/1999 | |
| JP | 11-156188 | 6/1999 | |
| JP | 198805 | 7/2000 | |
| JP | 2000-198805 | 7/2000 | |

* cited by examiner

Primary Examiner—Elena Tsoy
(74) Attorney, Agent, or Firm—Oblon, Spivak, McClelland, Maier & Neustadt, P.C.

(57) ABSTRACT

This invention discloses a continuous production method of water-absorbing composite which comprises a complexation step for producing a particle-substrate composite by dropwisely supplying an aqueous solution of polymerizable monomers consisting mainly of an unsaturated carboxylic acid where 20% or more of the carboxyl groups in the unsaturated acid is neutralized, while allowing polymerization to proceed in the droplets, onto a fibrous substrate fed to the drop point to allow the incompletely polymerized polymer particles to adhere thereon, and by completing the polymerization thereafter; and a surface crosslinking step for reacting the composite with a crosslinking agent, having two or more functional groups capable of reacting with carboxyl group and/or carboxylate group, in the presence of 1 to 100 weight parts of water per 100 weight parts of polymer particles derived from the polymerizable monomer contained in the composite. Such continuous production method is successful in producing, in a continuous and efficient manner, a water-absorbing composite excellent in water absorption property and water retention property.

82 Claims, 3 Drawing Sheets

CONTINUOUS PRODUCTION METHOD OF WATER-ABSORBING COMPOSITE

FIELD OF THE INVENTION

The present invention relates to a method for continuously producing a water-absorbing composite comprising a fibrous substrate such as non-woven fabric and water-absorbing polymer particles bound thereon. The water-absorbing composite produced by the production method of the present invention is preferably used for producing water-absorbing articles such as paper diaper and sanitary napkin.

RELATED ART

Paper, pulp, non-woven fabric, spongy urethane resin, etc. have been widely used as a water retainer for a variety of sanitary goods such as sanitary napkin and paper diaper, and agricultural materials by virtue of their excellent water absorption property. These materials can, however, absorb water only as much as approx. 10 to 50 times their own weights, so that absorption or retention of a large volume of water require a large volume of such materials, which makes such materials very bulky. Such materials were also disadvantageous in that readily releasing water when they are pressurized after absorbing water.

To overcome the foregoing problems of such water-absorbing articles, a variety of water-absorbing polymer materials are proposed in recent years. Such proposed materials include, for example, a graft polymer of starch (Examined Japanese Patent Publication No. 53-46199), a cellulosic modified material (Laid-Open Japanese Patent Publication No. 50-80376), a crosslinked water-soluble polymer (Examined Japanese Patent Publication No. 43-23462) and an alkaline metal salt of self-crosslinked acrylic polymer (Examined Japanese Patent Publication No. 54-30710).

Although water absorption property of such water-absorbing polymers have reached an almost satisfiable level, most of them are only available as powder, so that it has been necessary to homogeneously disperse such water-absorbing resin powder onto a substrate such as tissue paper, non-woven fabric or cotton pad when such powder is intended for use as sanitary materials such as for sanitary napkin, paper diaper and so forth. The water-absorbing resin powder dispersed by any known methods is, however, only less stably immobilized onto the fibrous substrate, where the powder tends to locally concentrate even after being homogeneously dispersed. It is also undesirable that swollen gel produced after water absorption will not stably be immobilized onto the fibrous substrate and will be ready to migrate therefrom. One possible method for preventing such migration is to adhere the water-absorbing resin powder using an adhesive to fluffed pulp or the like, which however ruin the water absorption property intrinsic to the water-absorbing resin powder since the adhesive inhibits the swelling of such powder.

Moreover in the foregoing method for homogeneously dispersing the water-absorbing resin powder onto the fibrous substrate to thereby obtain a water-absorbing material, the polymer powder is not only likely to drop out from the fibrous substrate but is also inconvenient to handle and thus requires additional consideration on a process for ensuring the homogeneous dispersion, which inevitably raised the costs to a significant degree.

One method for solving such problem is proposed in which liquid droplets, comprising a mixed solution of an aqueous solution of an acrylic acid type polymerizable monomer and a redox-type polymerization initiator and allowing polymerization to start therein, are immobilized onto a fibrous substrate and allows the polymerization to proceed further (Laid-Open Japanese Patent Publication No. 9-67403). This method is successful in producing a water-absorbing composite having an excellent water absorption property and water absorption speed, in which water-absorbing polymer particles are stably immobilized onto a fibrous substrate. Some applications of the product, however, require still more advanced water absorption property than that of such water-absorbing composite.

It is therefore an object of the present invention to provide an efficient continuous production method of water-absorbing composite in which water-absorbing polymer particles are immobilized, concomitantly with the production thereof, onto a fibrous substrate so as to fully exhibit their intrinsic water absorption property and water retention property. It is also an object of the present invention to provide a highly practical water-absorbing articles using such characterized water-absorbing composite.

DISCLOSURE OF THE INVENTION

After a series of extensive investigations, the present inventors came to propose a continuous production method of a water-absorbing composite of the present invention, which comprises:

(A) a complexation step for producing a particle-substrate composite by dropwisely supplying an aqueous solution of polymerizable monomers consisting mainly of an unsaturated carboxylic acid where 20% or more of the carboxyl groups in the unsaturated acid is neutralized, while allowing polymerization to proceed in the droplets, onto a fibrous substrate fed to the drop point to allow the incompletely polymerized polymer particles to adhere thereon, and by completing the polymerization thereafter; and (B) a surface crosslinking step for reacting the composite with a crosslinking agent, having two or more functional groups capable of reacting with carboxyl group and/or carboxylate group, in the presence of 1 to 100 weight parts of water per 100 weight parts of polymer particle derived from the polymerizable monomer contained in the composite.

The continuous production method may preferably have, prior to the surface crosslinking step, a water content adjustment step for adjusting water content of the polymer particles composing the particle-substrate composite within a range from 10 to 40 wt %, and also may have, posterior to the complexation step, a residual monomer processing step for processing the polymerizable monomer remaining in the polymer particles composing the particle substrate composite. In the continuous production method of the present invention, water content of the polymer particles composing the particle-substrate composite subjected to the surface crosslinking step is within a range from 10 to 40 wt %, At least a part of the polymer particles of the particle-substrate composite obtained in the complexation step preferably forms granular aggregates in which the polymer particles are bound with each other, and a part of the polymer particles composing the granular aggregates is not directly bound to the fibrous substrate.

The present invention also provides a water-absorbing composite produced by such continuous production method. The water-absorbing composite of the present invention is preferably such that having a water absorption, measured by allowing the water-absorbing composite to absorb physiological saline for 10 minutes under a pressure of 40 g/cm², of 15 g or above per gram of such water-absorbing polymer immobilized to such composite.

The present invention still also provides a water-absorbing article using such water-absorbing composite.

BRIEF DESCRIPTION OF THE DRAWINGS

In these figures, reference numeral 1 represents a roll of non-woven fabric, 2 represents a non-woven fabric, 3 represent a polymerization chamber, 4 represents a dewatering chamber, 5 represents a distillation tower, 6 represents a surface crosslinking apparatus, 7 represents a polymerizable monomer extraction chamber, 8 represents a drying drum, 9 represents a winder for taking up a water-absorbing composite, 11 represents a nozzle for injecting solution "A", 12 represents a nozzle for injecting solution "B", 13 represents the solution "A", 14 represents the solution "B", 21 represents a burette, 22 represents a rubber stop, 23 represents a pierced support plate, 24 represents a non-woven fabric and 25 represents polymer particles.

DETAILED DESCRIPTION OF THE INVENTION

The continuous production method of the water-absorbing composite of the present invention, the water-absorbing composite thus produced, and water-absorbing articles will be detailed hereinafter.

The production method of the water-absorbing composite of the present invention includes the foregoing complexation step and the surface crosslinking step.

In the complexation step, the polymerization is proceeded in a gas phase while dispersing an aqueous solution of polymerizable monomer in a droplet form. Such way of polymerization is already known, in which the aqueous solution of polymerizable monomer containing a polymerization initiator is generally fed into a liquid dispersion apparatus provided at the top portion of a polymerization chamber, and the polymerization is proceeded during such solution in a droplet form falls down in the polymerization chamber, The polymerizable monomer available in the complexation step may be arbitrary so far as it can yield a water-absorbing polymer, and general examples thereof include unsaturated carboxylic acids such as acrylic acid, methacrylic acid, maleic acid and itaconic acid. It is also allowable as required to use some of such carboxylic acids in an arbitrary combination, or to use any of such carboxylic acid with other monomer such as (meth) acrylamide and 2-hydroxyethyl (meth) acrylate. Among these, acrylic acid or methacrylic acid is preferably used. Acrylic acid is most preferable, and it is recommendable to use acrylic acid without any mixed components, or monomer mixture in which acrylic acid accounts for 50 mol % of the total, and more preferably 80 molt or more.

At least a part of such unsaturated carboxylic acid is preferably used herein in a form of alkaline metal salt or ammonium salt, which desirably improves the water absorption property of the resultant water-absorbing polymer, For the case of using acrylic acid for example, the resultant water-absorbing polymer will have a dramatically improved water absorption property when the monomer containing alkali metal salt or ammonium salt in a ratio of 20% or more, and more preferably 20 to 90%, was subjected to the polymerization.

The solution of polymerizable monomer subjected to the polymerization in the present invention can contain a small amount of crosslinking agent as required. Examples of such crosslinking agent include N,N'-methylene-bis(meth) acrylamide and (poly)ethyleneglycol diglycidyl ether, and the amount use thereof is generally 0.01 to 1 wt % of the monomer, and more preferably 0.05 to 0.5 wt %. Too much crosslinking agent tends to degrade the water absorption property of the resultant resin particles.

The concentration of the polymerizable monomer in the monomer solution is generally 20 wt % as a sum of the individual weights of those in a free form and salt form, and preferably 25 wt %. Too low monomer concentration will make it difficult to produce the droplets having an appropriate viscosity, which tends to cause deformation of such droplets when they adhere onto the fibrous substrate, to thereby ruin physical properties of the resultant water-absorbing composite. The upper limit of the monomer concentration is 80 wt % or around in consideration of the handling property of the solution.

As for the polymerization initiator, it is preferable to use a redox-type polymerization initiator which comprises a radial generator as an oxidizing agent as combined with a reducing agent. Hydrogen peroxide is a preferable radical generator, where other possible examples include persulfates such as ammonium persulfate and potassium persulfate; hydroperoxides such as t-butylhydroperoxide and cumene hydroperoxide; secondary cerium salts, permanganates, chlorites; and hypochlorite salts. Such radical generators are preferably used in an amount of 0.01 to 10 wt %, and more preferably 0.1 to 2 wt %, of the polymerizable monomer.

As for reducing agent, it is preferable to use L-ascorbic acid or an alkaline metal salt thereof, where other possible examples thereof include sulfites such as sodium sulfite and sodium hydrogen sulfite; sodium thiosulfite; cobalt acetate; copper sulfate and ferrous sulfate. Such reducing agent are preferably used in an amount of 0.01 to 10 wt %, and more preferably 0.1 to 2 wt %, of the polymerizable monomer.

Figure 2:
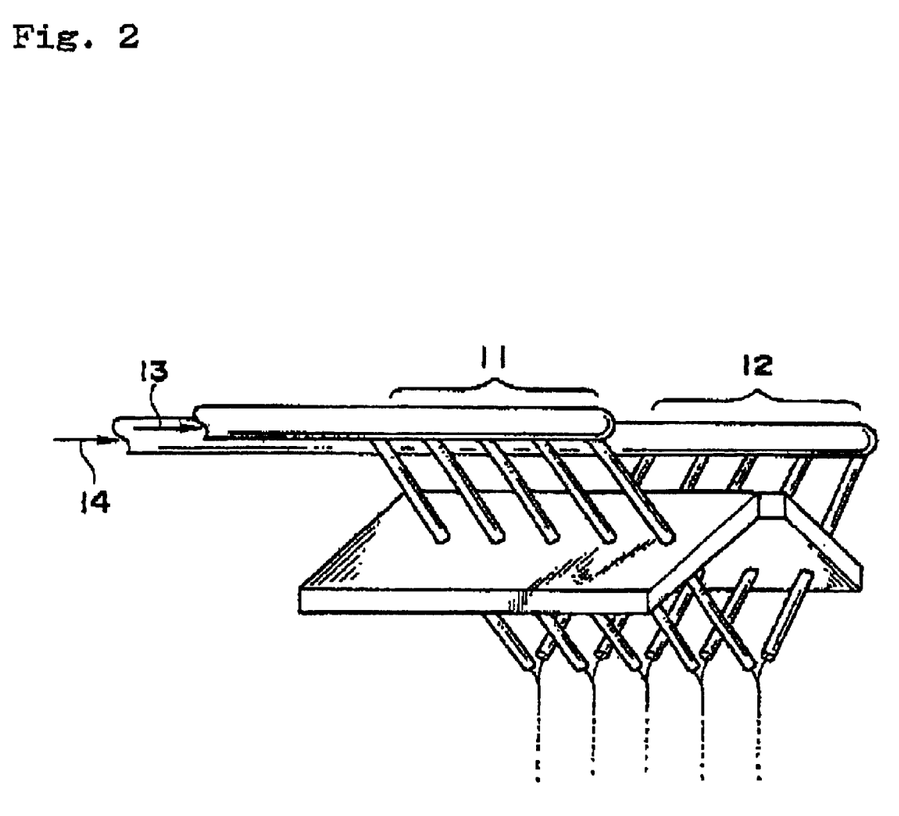
FIG. 2 is a schematic view showing a nozzle structure used for practicing a mixing step in the production method of the present invention.

While the polymerization reaction can be proceeded by various known processes, one preferable process is disclosed in Japanese Laid-Open Patent Publication No. 10-330283, in which an aqueous solution of polymerizable monomer containing a radical generator and an aqueous solution of polymerizable monomer containing a reducing agent are injected from respective nozzles opened as being opposed with each other at the top portion of a polymerization chamber so as to form liquid columns and collide them in the air, to thereby disperse the mixed liquid in a droplet form (FIG. 2). One preferable example of such method relates to mixing in a gas phase, of a first solution containing an oxidizing agent as one component of the redox-type polymerization initiator and the aqueous solution of polymerizable monomer, and a second solution containing a reducing agent as another component of the redox-type polymerization initiator and the aqueous solution of polymerizable monomer. The size of the droplets is preferably 5 to 3,000 μm, and more preferably 50 to 1,000 μm. The polymerization reaction starts upon mixing of both liquids, and proceeds within the droplets while falling down in the polymerization chamber, The atmosphere in the polymerization chamber may be arbitrary so far as it does not adversely affect the polymerization reaction. While the general atmospheric gas is nitrogen, helium, carbon dioxide or the like, it is also allowable to use air or steam. The temperature of the atmosphere is adjusted between the room temperature and 150° C., and more preferably between the room temperature and 100° C. for the case that steam is introduced into the atmosphere, the temperature is adjusted so as to optimize the water vaporization from the aqueous solution of monomer to be subjected to the reaction in consideration of the concentration of such solution, and a desired water content of the resultant polymer particles.

In the present invention, it is preferable to feed a sheet-type fibrous substrate into the polymerization chamber and make it run in parallel to the floor plane of such polymerization chamber so as to adhere the falling polymer particles thereon. Any fibrous substrate will be available provided that it is formed into a predetermined shape and can readily adhere thereon the polymer particles on the halfway of the polymerization, which maybe composed of cloth, paper, pulp or non-woven fabric, Among these, fluffed pulp or non-woven fabric is preferable since such fibrous substrate is composed as relatively sparse so as to allow the polymer particles to come inside so that the polymer particles can strongly adhere onto the fibrous substrate. Particularly preferable is non-woven fabric made of (semi) synthetic fiber having an excellent strength even under a moist condition, where examples of which include polyester, polyolefin, polyamide and acetate. The diameter of the fiber composing such non-woven fabric is preferably 10 to 30 $\mu$m, and the basis weight is preferably 10 to 100 g/m$^2$, and more preferably 20 to 50 g/m$^2$.

Various conditions will be adjusted so that the polymerization ratio at the point of time when the granular aggregate is formed within the falling droplets on the halfway of the polymerization in the air, or formed upon contact with the substrate can be adjusted within a range from 3 to 97%, more preferably 20 to 97%, and still more preferably 50 to 95%. If the polymerization ratio is too low, integrated large particles will be formed upon the liquid collision rather than producing the granular aggregate, and such droplets will be spread over the substrate or absorbed or occluded therein upon falling onto the substrate, which prevents the polymer particles from adhering onto the substrate in a form of granular aggregate. On the contrary, too high polymerization ratio will prevent the polymer particles from exhibiting an appropriate adhesive force, which eventually ruin the immobilization property of the water-absorbing polymer on the substrate. In the complexation step, a polymerization ratio of the polymerizable monomer at the point of time that the droplets come into contact with the fibrous substrate is preferably 20 to 97%.

The polymer particles can be adhered on the resultant water-absorbing composite in an amount of 50 to 400 g/m$^2$ and generally in an amount of 80 to 300 g/m$^2$ depending on the applications. Too small content of the polymer particles in the water-absorbing composite naturally reduces the water absorption property. On the contrary, too large content ruins the economic efficiency, and also ruins the binding force of the polymer particles to the fibrous substrate since a ratio of portions responsible for binding to the fibrous substrate decreases.

The polymer particles composing the water-absorbing composite produced by the continuous production method of the present invention is preferably such that a part of which on the halfway of the polymerization (primary particles) forms granular aggregates in which the polymer particles are bound with each other, and a part of the polymer particles composing the granular aggregates is not directly bound to the fibrous substrate. Such granular aggregate has a large specific surface area and thus has a larger water absorption speed, and is less constrained by the fibrous substrate when the granular aggregate swells since it is bound only through a part of the primary particles composing thereof, all of which ensures an excellent water absorption property. Joint planes of the individual primary particles composing the granular aggregate are integrated, so that the granular aggregate is not likely to decompose into the primary particles nor drop from the fibrous substrate before water absorption and even after water absorption.

It is preferable that the granular aggregates account for 30 wt % or more of the polymer particles, more preferably 50 wt % or more, and still more preferably 80 wt % or more. In general, larger ratio of the granular aggregate ensures better performance as a water absorbent. It is preferable that the grain size of the granular aggregate is substantially in a range from 100 to 3,000 $\mu$m. The grain size smaller than 100 $\mu$m tends to result in insufficient water absorption property. The grain size exceeding 3,000 $\mu$m tends to weaken the adhesive force with the sheet-formed substrate. The ratio and grain size of the granular aggregate can be controlled mainly by properly adjusting the density, distribution state, fluidization state or the like of the particles on the halfway of the polymerization in the gas phase. Raising the ratio of the granular aggregate for example can he accomplished by raising the amount of falling polymer per unit sectional area of the polymerization charter or by reducing the failing speed of the polymer particles by generating an upflow within the polymerization chamber so as to increase opportunities of mutual contact of the falling particles on the halfway of the polymerization. It is also preferable to generate a drift within the polymerization charmer to thereby generate non-uniform distribution of the falling polymer particles.

Thus-obtained particle-substrate composite comprising the fibrous substrate and polymer particles on the halfway of the polymerization adhered thereon is preferably subjected to the water content adjustment step for removing a part of water contained in the polymer particles by bringing them into contact with a hydrophilic organic solvent to thereby adjust the water content suitable for the successive surface crosslinking. In the present invention, the cross linking is proceeded by adding a crosslinking agent in the presence of 1 to 100 weight parts of water per 100 weight parts of the polymer particles derived from the polymerizable monomer in the particle-substrate composite. In particular the water content of the polymer particles at the point of time of adding the crosslinking agent is preferably within a range from 10 to 40 wt %. Any water content out of the above range tends to make it difficult to obtain the polymer particles having an excellent water absorption property, It should now be noted that the "water content" refers to a weight of water contained in the polymer particles as expressed in weight per cent (wt %) assuming the weight of the polymer particles in a fully swollen state as 100 wt %.

The hydrophilic organic solvent used in the water content adjustment step is such that having a water content of 30 wt % or less, and in particular preferable is ethanol, methanol or acetone having a water content of 10 wt % or less. One example of the possible method is such that immersing the particle-substrate composite into a dewatering chamber containing such ethanol or methanol, and then removing the adhered ethanol or methanol by passing through pressure rolls under a light pressure so as not to crash the polymer particles, or by blowing the air. The removal of such alcohol is necessary only to a degree which causes no problem in wetting with a crosslinking agent solution used in the successive surface crosslinking step, and there is no need to completely remove such adhered alcohol. The immersion can generally be completed at the room temperature for approx. 30 seconds to 5 minutes, which may vary depending on the water content of the polymer particles subjected to the dewatering and the water content of the target polymer particles. The particle-substrate composite taken out from the polymerization chamber almost completes the polymerization while being conveyed into the dewatering chamber and also cooled to the room temperature in general, so that there is no need in the usual process to forcedly coal the composite before being introduced into the dewatering chamber.

It is now also possible to properly adjusting the water content of the polymer particles composing the particle-substrate composite taken out from the polymerization chamber to 10 to 40 wt %, which is suitable for the surface crosslinking, by controlling in the complexation step the concentration of the aqueous solution of monomer subjected to the polymerization reaction, and the temperature or humidity of the atmosphere to the polymerization chamber. In such case, the water content adjustment step is no more necessary.

The particle-substrate composite having a water content lowered to a desired level in the water content adjustment step is then sent to the surface crosslinking step. It has already been known that properties of the polymer particles can be improved by surface crosslinking which can be accomplished by adding a crosslinking agent to the surface of the water-absorbing polymer particles and then heating. It is supposed that the selective formation of a crosslinked structure on the surface will be responsible for retaining the shape of the polymer particles without inhibiting the swelling with water. In such process, the particle-substrate composite is first treated with solution of a surface crosslinking agent. Available examples of the surface crosslinking agent include multifunctional compound co-polymerizable with a polymerizable monomer, which are typified by N,N'-methylenebis(meth)acrylamide or (poly) ethyleneglycol bins(meth)acrylate; and compounds having a plurality of functional groups capable of reacting with carboxyl group, which is typified by (poly)ethyleneglycol glycidyl ether. Preferable crosslinking agent relates to those having a glycidyl group, where polyglycidyl ether is particularly preferable. Such surface crosslinking agent is generally used in an amount of 0.1 to 1 wt %, and more preferably 0.2 to 0.5 wt % of the polymer particles (on the dry basis). Such surface crosslinking agent is preferably used as dissolved in water or alcohol (ethanol, methanol, etc.) at a concentration of 0.1 to 1 wt %, in particular 0.2 to 0.5 wt %, so that the agent can uniformly be provided over the entire surface of the polymer particles. The provision of the crosslinking agent is generally effected by spraying a crosslinking agent solution to the polymer particles using an atomizer; or by coating a crosslinking agent solution by passing the particle-substrate composite on a roll brush, where the particle-substrate composite is kept in a facedown manner, and the lower portion of the roll brush is immersed into such crosslinking solution in a container. It is also allowable to supply an excessive amount of crosslinking agent solution and then remove the excessive portion thereof by lightly pressing the composite with press rolls so as not to crush the polymer particles or by blowing the air. The wetting with such crosslinking agent solution can be conducted at the room temperature, The particle-substrate composite thus wetted with the crosslinking agent solution is then heated to proceed crosslinking, to thereby form a crosslinked structure selectively on the surface of the polymer particles. Conditions for the crosslinking reaction can properly be selected depending on the crosslinking agent, where general conditions relate to a temperature at 100° C. or above, and a reaction time of 10 minutes or longer, The water absorption property of the water-absorbing composite produced by the continuous production method of the present invention is substantially governed by the processes up to such surface crosslinking step.

After the surface crosslinking step, the particle-substrate composite is preferably sent to the residual monomer processing step. Since the polymerizable monomer remaining as non-reacted within the polymer particles of the particle-substrate composite is hazardous to human body, such residual monomer is reduced in such step to an allowable level depending on the applications.

For example, using a partially-neutralized acrylic acid as the polymerizable monomer generally causes several hundred ppm, or even at a level of 1,000 ppm or above, of such residual monomer. When the product is intended for use as paper diaper or sanitary napkin, the residual amount is preferably suppressed to 500 ppm or below, more preferably 300 ppm or below, and most preferably 100 ppm or below.

The processing of the residual monomer can be conducted by several methods. One example of such method relates to promotion of polymerization of the residual monomer, which may typically be accomplished by heating the particle-substrate composite to 100 to 250° C. to complete the polymerization of the residual monomer; or by polymerizing the polymerizable monomer after adding to the polymer particles a catalyst or catalytic component capable of accelerating the polymerization of the polymerizable monomer, which is again followed by heating. For example, using the foregoing redox-type polymerization initiator for such polymerization tends to generate the residual radical generator, which may further be processed using solution of a reducing agent. Available examples of such reducing agent include sodium sulfite, sodium hydrogen sulfite or L-ascorbic acid, all of which used as one component of the redox-type polymerization initiator, and are generally added to the polymer particles in a form of a 0.5 to 5% aqueous solution. The amount of addition of the reducing agent may be 0.1 to 20 weight parts per 100 weight parts of the dried polymer. The reducing agent solution can be added by arbitrary methods, for example by spraying using an atomizer or by immersing therein. The polymer particles added with the reducing agent are then heated to polymerize the polymerizable monomer. The heating can be completed, for example, at 100 to 150% for 10 to 30 minutes. Such heating can lower the water content of the polymer particles, where it is also allowable to further dry the polymer particles to obtain the final product if the water content still remains at a high level. It is still also allowable to heat the polymer particles after adding a peroxide and/or an azo compound in an amount of 0.01 to 1 weight part per 100 weight parts of the polymer particles In the particle-substrate composite, to thereby reduce the residual monomer level.

Still another process for promoting the polymerization of the residual monomer relates to irradiation of the ultraviolet radiation or radioactive ray.

The ultraviolet irradiation can be effected using a general ultraviolet lamp, where irradiation intensity, irradiation time and so forth are determined depending typically on the type of the fibrous substrate, or immersed amount of the polymerizable monomer. The radiation intensity of the ultraviolet lamp is generally 10 to 200 W/cm, more preferably 3 to 120 W/cm; irradiation time is 0.1 seconds to 30 minutes; and the lamp-composite distance is 2 to 30 cm. The atmosphere in which the ultraviolet irradiation proceeds may be any one of inorganic gases such as nitrogen, argon and helium; or the air. There is no special limitation on the irradiation temperature, where the room temperature can yield a desirable result, Also a ultraviolet irradiation device is not specifically limited, where allowable mechanism is such that effecting irradiation for a predetermined time while keeping the composite static, or effecting continuous irradiation while moving the composite on a belt conveyer.

The water content of the composite in such case is generally adjusted within a range from 0.01 to 40 weight parts per 1 weight parts of the polymer, and more preferably 0.1 to 1.0 weight parts. The water content less than 0.01 weight parts or exceeding 40 weight parts tends to adversely affect the reduction in amount of the non-reacted monomer. The water content within the above range can be accomplished by controlling thereof during the complexation step and/or surface crosslinking step, or by adjusting thereof after the surface crosslinking step.

In the method using radioactive irradiation high-energy radioactive ray such as electromagnetic radioactive ray or particulate ionized radioactive ray is used. More particularly, accelerated electron beam and gamma ray are exemplified. Dose to be irradiated may vary depending on the amount of the non-reacted monomer or water content in the complex, where general range thereof is 0.01 to 100 megarad, and more preferably 0.1 to 50 megarad. The dose exceeding 100 megarad will significantly degrade the water absorption property, and the dose below 0.01 megarad will make it difficult to obtain the complex excellent in the water absorption property and absorption speed, and extremely small in the amount of non-reacted monomer.

The water content of the composite at this point of time is generally selected as 40 weight parts or less per one weight part of the fibrous substrate, and more preferably 10 weight parts or less. The water content exceeding 40 weight parts will undesirably reduce improving effect of the water absorption speed, and will in particular adversely affect the reduction in amount of the non-reacted monomer.

The atmosphere in which the high-energy radioactive irradiation proceeds may be any one of inorganic gases such as nitrogen, argon and helium; or the air. Preferable atmosphere is the air, in which the irradiation will successfully improve the water absorption property and water absorption speed, and will lower the content of the non-reacted monomer. There is no special limitation on the irradiation temperature, where the room temperature can yield a desirable result.

Another method for processing the non-reacted polymerizable monomer relates to removal the residual monomer. For example, the particle-substrate composite recovered from the surface crosslinking step is cooled and the immersed into the water-containing organic solvent to thereby extract the polymerizable monomer. The water-containing organic solvent is exemplified as ethanol, methanol and acetone, where the water content thereof is preferably within a range from 10 to 90 wt %, and more preferably 30 to 60 wt %. Although it is generally accepted that larger water content ensures higher ability in reducing the polymerizable monomer, using an organic solvent having a large water content undesirably raise energy consumption in the successive drying step. The immersion of the particle-substrate composite into the water-containing organic solvent for approx. 5 to 30 minutes will suffice in general, and it is also preferable to combine therewith means for enhancing the extraction of the polymerizable monomer, such as shaking of the particle-substrate composite. After the immersion, the composite is dried using a drying apparatus, to thereby produce a final product using such water-absorbing composite. The composite is dried so as to generally attain the water content of the polymer particles of 10% or around.

A still another method for removing the polymerizable monomer is such that treating the particle-substrate composite with superheated steam or steam-containing gas. For example, a saturated steam at 110° C. is further heated to 120 to 150° C. to produce superheated steam, with which the particle-substrate composite is contacted to thereby reduce the polymerizable monomer remaining in the polymer particles. In such method, it is supposed that the polymerizable monomer vaporizes to escape from the polymer particles concomitantly with vaporization of water which escapes in a form of steam from the polymer particles. Such method is advantageous in that the removal of the polymerizable monomer and drying of the final product can be accomplished in a single process.

In the present invention, the foregoing complexation and the surface crosslinking step are essential steps, and the water content adjustment step and the residual monomer treatment step are preferable, optional steps. Order of these steps is arbitrary except that the complexation step always comes first. Preferable processes are such that having the complexation step, surface crosslinking step and residual monomer processing step in thin order; such that having the complexation step, residual monomer processing step and surface crosslinking step in this order; such that having the complexation step, residual monomer processing step, water content adjustment step and surface crosslinking step in this order; such that having the complexation step, water content adjustment step, surface crosslinking step and residual monomer processing step in this order; and such that having the complexation step, water content adjustment step, residual monomer processing step and surface crosslinking step in this order.

Figure 1:
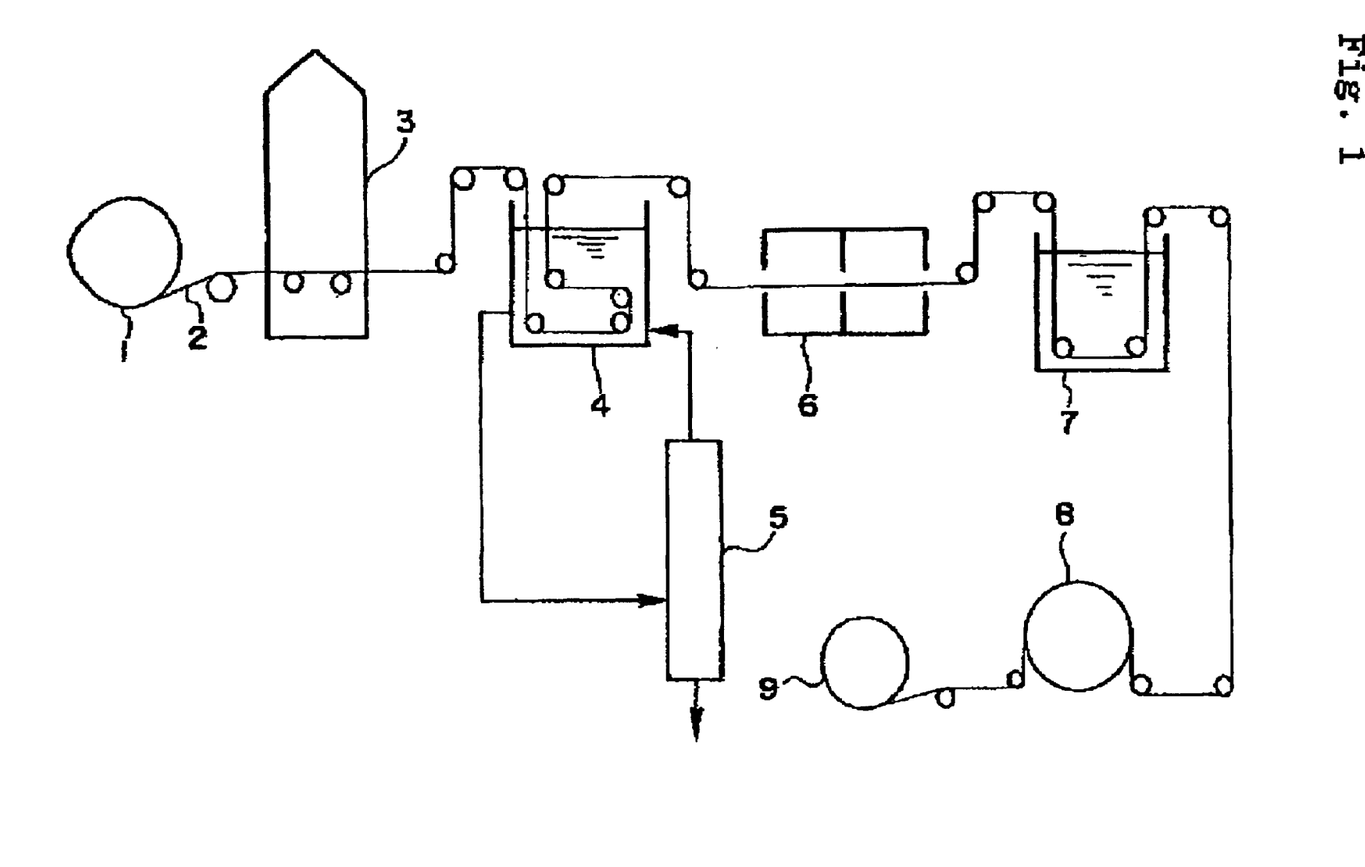
FIG. 1 is an exemplary flow sheet for explaining continuous production of a water-absorbing composite according to a method of the present invention.

An exemplary method for producing the water-absorbing composite according to the continuous production method of the present invention will be explained referring to FIG. 1, A polyester non-woven fabric 2 having a basis weight of 35 g/m² and being taken up on a roll 1 is fed while being rewound into a polymerization chamber 3 so as to run in parallel to the floor plane thereof at a speed of 30 m/min. At the top portion of the polymerization chamber, five pairs of nozzles are located at 1 cm intervals, where each pair comprising a nozzle for injecting an aqueous solution of polymerizable monomer "A" containing a reducing agent and a nozzle for injecting an aqueous solution of polymerizable monotone "B" containing an oxidizing agent, which are opposed so as to direct the opening thereof downward, Conditions include an inner diameter of the nozzle of 0.18 mm, an opposing angle of the nozzles of 30°, an opposition interval between the nozzles of 3.5 mm, and a height of the opening end of the nozzle from the non-woven fabric plane of 3 m.

The aqueous solution of polymerizable monomer shown below are supplied at the room temperature and injected from the individual nozzles at a speed of 5.0 m/sec. The polymerization chamber is supplied with steam-containing air from the lower portion thereof so as to condition the atmospheric temperature within a range from approx. 20 to 60°, and the humidity from approx. 30 to 100%, which is then discharged form the top portion to the chamber. The discharged air is introduced into a discharged gas processing device.

Aqueous Solution of Polymerizable Monomer "A":

A 50% aqueous solution of acrylic acid/sodium acrylate (acrylic acid:sodium acrylate=4:6 in molar ratio) containing hydrogen peroxide in an amount of 2.8 wt % of the total weight of acrylic acid and sodium acrylate.

Aqueous Solution of Polymerizable Monomer "B":

A 50% aqueous solution of acrylic acid/sodium acrylate (acrylic acid:sodium acrylate=4:6 in molar ratio) containing sodium L-ascorbate in an amount of 1.1 wt % of the total weight of acrylic acid and sodium acrylate.

The aqueous solutions of polymerizable monomer "A" and "B" injected from the nozzles collide with each other to produce droplets, and the droplets fall down while proceeding therein the polymerization onto the non-woven fabric, and adhere thereon in a form of polymer particles having a polymerization degree of approx. 95% or above. The amount of adhesion of the polymer particles is approx. 200 g/m$^2$ on the dry polymer basis. The polymer particle has a grain size of approx. 200 to 1,500 μm, and approx. 90% of which forms granular aggregates.

The non-woven fabric having the polymer particles adhered thereon is then sent to the dewatering chamber 4. The dewatering chamber 4 contains a 96% ethanol, and the non-woven fabric is immersed therein for 5 minutes so as to attain the water content of approx. 20% on the water-containing polymer basis. A part of the ethanol reserved in the dewatering chamber is continuously withdrawn to be subjected to dewatering distillation in the distillation tower 5 and then returned to the dewatering chamber, by which the water content of the ethanol can be kept constant.

After being taken out from the dewatering chamber, the non-woven fabric having the polymer particles adhered thereon is blown with the air to remove the adhering ethanol, and is then introduced into the surface crosslinking apparatus 6. In the apparatus, a 0.5 wt % ethanol solution of ethyleneglycol diglycidyl ether is sprayed in an amount of 0.35 wt % of the polymer particles on the dry polymer basis, and the crosslinking is allowed to proceed at approx. 110° C. for 30 minutes.

After being taken out from the surface crosslinking apparatus, the non-woven fabric is cooled by blowing the air, and is then sent to the non-reacted polymerizable monomer extraction chamber 7. The extraction chamber 7 contains a 50% water-containing ethanol at the room temperature, and the non-woven fabric is immersed therein for 20 minutes so as to lower the content of the non-reacted polymerizable monomer an the polymer particles to as low as approx. 80 ppm on the dry polymer basis. The non-woven fabric taken out from the extraction chamber is then brought into contact with the drying drum 8, inside of which being supplied with steam, to thereby remove ethanol and water by vaporization. Thus-produced water-absorbing composite is taken up on the winder 9 and shipped as a product. Now, a part of the water-containing ethanol in the extraction chamber is continuously withdrawn and a new portion of water-containing ethanol is supplemented so as to avoid accumulation of the monomer.

The water-absorbing composite produced by the continuous production method of the present invention exhibits an excellent water absorption property. The water absorption property of the water-absorbing composite has a multi-lateral nature, and can be assessed by various methods according to intended use of such composite. More specifically, the property can typically be assessed by measuring water absorption property (a volume of liquid absorbed within a predetermined time period, as expressed in weight per unit weight of the water-absorbing polymer); water retention property (a volume of liquid weight retained in the water-absorbing composite once absorbing the liquid and then dewatered under a predetermined condition, as expressed in weight per unit weight of the water-absorbing polymer) water absorption speed under normal pressure (a volume of liquid absorbed within a predetermined short time period, as expressed in weight per unit weight of the water-absorbing polymer); and water absorption speed under pressure (a volume of liquid absorbed within a predetermined short time period under a predetermined pressure, as expressed in weight per unit weight of the water-absorbing polymer); all of which are measured by using water, physiological saline, artificial urine or the like as an absorbed liquid.

The continuous production method of the present invention will successfully provide a water-absorbing composite having a water absorption property as enumerated below in terms of water absorption speed measured under pressure using a measurement instrument and physiological saline in compliance with JIS K-7224. More particularly, a water-absorbing composite having a water absorption, measured by allowing the water-absorbing composite to absorb physiological saline for 10 minutes under a pressure of 40 g/cm$^2$, of 15 g or above per gram of such water-absorbing polymer immobilized to such composite; having a water absorption, measured by allowing the water-absorbing composite to absorb physiological saline for 20 minutes under a pressure of 40 g/cm$^2$, of 18 g or above per gram of such water-absorbing polymer immobilized to such composite; having a water absorption, measured by allowing the water-absorbing composite to absorb physiological saline for 60 minutes under a pressure of 40 g/cm$^2$, of 22 g or above per grant of such water-absorbing polymer immobilized to such composite having a water absorption, measured by allowing the water-absorbing composite to absorb physiological saline for 10 minutes under a pressure of 60 g/cm$^2$, of 13 g or above per gram of such water-absorbing polymer immobilized to such composite; having a water absorption, measured by allowing the water-absorbing composite to absorb physiological saline for 20 minutes under a pressure of 60 g/cm$^2$, of 15 g or above per gram of such water-absorbing polymer immobilized to such composite; or having a water absorption, measured by allowing the water-absorbing composite to absorb physiological saline for 60 minutes under a pressure of 60 g/cm$_2$, of 19 g or above per gram of such water-absorbing polymer immobilized to such composite is preferably provided.

In particular, a water-absorbing composite showing a sum of water absorptions, measured by allowing the water-absorbing composite to absorb physiological saline for 10 minutes under a pressure of 40 g/cm$^2$ and 10 minutes under a pressure of 60 g/cm$^2$, of 28 g or above per gram of such water-absorbing polymer immobilized to such composite; showing a sum of water absorptions, measured by allowing the water-absorbing composite to absorb physiological saline for 20 minutes under a pressure of 40 g/cm$^2$ and 20 minutes under a pressure of 60 g/cm$^2$ of 33 g or above per gram of such water-absorbing polymer immobilized to such composite; or showing a sum of water absorptions, measured by allowing the water-absorbing composite to absorb physiological saline for 60 minutes under a pressure of 40 g/cm² and 60 minutes under a pressure of 60 g/cm², of 40 g or above per gram of such water-absorbing polymer immobilized to such composite is preferably provided. Such water-absorbing composite may properly be selected depending on the intended use.

Such water-absorbing composite can be used for various applications to which conventional water-absorbing articles have been applied. Examples of applications of such water-absorbing articles are described in "Kyusuisei Porima (water-absorbing polymer)", p.81–111 (written by Fusayoshi Hasuda, published by Kyoritsu Shuppan, 1987); "Kokyusuisei Jushi no Kaihatu Doko to sono Yoto Tenkai (Trends in Development of Water-Absorbing Resin and its Application Strategy)" (written by Eizo Ohmori, published by Techno Forum, 1987); Kenji Tanaka, Kogyo Zairyo (Industrial Materials), Vol. 42, No. 4, p.18–25, 1994; and Nobuyuki Harada and Tadao Shimomura, ibid, Vol, 42, No. 4, p.26–30, 1994. The water-absorbing composite of the present invention is available for such applications, which are typified as paper diaper, sanitary napkin, freshness retainer, moisturizer, cold insulator, anti-dewing agent and soil modifier.

The water-absorbing composite can also be used as a sheet-type water-absorbing composite disclosed for example in Laid-Open Japanese Patent Publication Nos. 63-267370, 63-10667, 63-295251, 63-270801, 63-294716, 64-64602, 1-231940, 1-243927, 2-30522, 2-153731, 3-21385, 4-133728 and 11-156118.

The present invention will be described in more detail referring to specific Examples, Comparative Examples and Test Examples. Materials, amount of use thereoto ratio of use, details of operations, operational procedures and the like can properly be modified without departing from the spirit of the present invention. Thus it is to be understood that the present invention is by no means limited to the specific examples explained below.

EXAMPLE 1

To 125 weight parts of an 80 wt % aqueous solution of acrylic acid, 57.3 weight parts of a 48.5% aqueous solution of sodium hydroxide, 6.4 weight parts of water, 0.15 weight parts of a crosslinking agent (N,N'-methylene-bisacrylamide) and 5.0 weight parts of a 30 wt % aqueous solution of hydrogen peroxide as an oxidizing agent were added to prepare solute on "A". The monomer concentration and the degree of neutralization of the solution "A" were 60 wt % and 50 mol %, respectively.

Separately to 125 weight parts of an 80 wt % aqueous solution of acrylic acid, 57.3 weight parts of a 48.54 aqueous solution of sodium hydroxide, 9.9 weight parts of water, 0.15 weight parts of a crosslinking agent (N,N'-methylene-bisaorylamride) and 1.5 weight parts of L-ascorbic acid as a reducing agent were added to prepare solution "B". The monomer concentration and the degree of neutralization of the solution "B" were same as those for solution "A".

Solutions "A" and "B" were respectively heated to 40° C. and fed using pumps respectively to each of five paired nozzles aligned at 1 cm intervals so as to be injected at a flow rate of 5 m/second, where each pair comprises, as shown in FIG. 2, two nozzles having an inner diameter of 0.13 mm opposed with each other so that solutions "A" and "B" injected therefrom will be crossed at a crossing angle of 30° and so as to keep the distance between both nozzle ends of 4 mm.

Solutions "A" and "B" individually injected from each nozzle of the paired nozzles in a form of liquid column were combined, then fell together while keeping a form of a single liquid column of approx. 10 mm long, and then fell in a form of droplets through a gas phase (in the air at 50° C.) while allowing the polymerization to proceed therein. A portion of such droplets collided in the gas phase to thereby form the granular aggregates, and such granular aggregates fell down on the polyester-made, non-woven substrate (basis weight: 30 g/m²) positioned 3 m downward from the nozzle end, to thereby complete the polymerization on such substrate. Another portion of the droplets directly fell down on such substrate, formed the granular aggregates thereon, and completed the polymerization. The water-absorbing polymer was thus immobilized on the substrate through such complexation processes. The water content of the water-absorbing polymer thus immobilized on the substrate was found to be 20 wt %.

Such composite was further sprayed with a 0.5 wt % ethanol solution of ethyleneglycol diglycidyl ether (EGDGE) so as to attain an amount of EGDGE of 3,000 weight ppm relative to the immobilized polymer (on the dry polymer basis). The composite sprayed with the EGDGE ethanol solution was then dried at 110° C. using a hot air drier until the water content of the immobilized polymer is reduced to 5%, to thereby obtain a water-absorbing composite having the polymer immobilized thereon in an amount of 200 g/m².

EXAMPLE 2

Process steps up to the complexation step were conducted similarly to those in Example 1, to thereby obtain a substrate having immobilized thereon the water-absorbing polymer (composite) with a water content of 20 wt %.

Such composite was then sprayed with a 0.5 wt % ethanol solution of ethyleneglycol diglycidyl ether (EGDGE) so as to attain an amount of EGDGE of 3,000 weight ppm relative to the immobilized polymer (on the dry polymer basis), The composite sprayed with the ethanol solution of EGDGE was sent to a vent band-type drier equipped with a steam supplier, and wag further blown at right angles with steam set at a temperature of 130° C. and a dew point of 120° C., where the contact of the composite with the steam was effected for 2 minutes at a linear velocity of 0.5 m/second. Thus the water-absorbing composite was completed. The polymer immobilized on the composite was found to have a water content of 5% and to be immobilized in an amount of 200 gm².

EXAMPLE 3

To 125 weight parts of an 80 wt % aqueous solution of acrylic acid, 57.3 weight parts of a 48.5% aqueous solution of sodium hydroxide, 68.8 weight parts of water, 0.15 weight parts of a crosslinking agent (N,N'-methylene-bisacrylamide) and 5.0 weight parts of a 30 wt % aqueous solution of hydrogen peroxide as an oxidizing agent were added to prepare solution "A". The monomer concentration and the degree of neutralization of the solution "A" were 45 wt % and 50 molt, respectively, Separately to 125 weight parts of an 80 wt % aqueous solution of acrylic acid, 57.3 weight parts of a 48.5% aqueous solution of sodium hydroxide, 72.5 weight parts of water, 0.15 weight parts of a crosslinking agent (N,N'-methylene-bisacrylamide) and 1.5 weight parts of L-ascorbic acid as a reducing agent were added to prepare solution "B". The monomer concentration and the degree of neutralization of the solution "B" were same as those for solution "A".

Solutions "A" and "B" were respectively heated to 50° C. and fed using pumps respectively to each of five paired nozzles aligned at 1 cm intervals so as to be injected at a flow rate of 5 m/second, where each pair comprises, as shown in FIG. 2, two nozzles having an inner diameter of 0.13 mm opposed with each other so that solutions "A" and "B" injected therefrom will be crossed at a crossing angle of 30° and so as to keep the distance between both nozzle ends of 4 mm.

Solutions "A" and "B" individually injected from each nozzle of the paired nozzles in a form of liquid column were combined, then fall together while keeping a form of a single liquid column of approx. 10 mm long, and then fell in a form of droplets through a gas phase (in the air at 50° C.) while allowing the polymerization to proceed therein. A portion of such droplets collided in the gas phase to thereby form the granular aggregates, and such granular aggregates fell down on the polyester-made, non-woven substrate (basis weight: 30 g/m$^2$) positioned 3 m downward from the nozzle end, to thereby complete the polymerization on such substrates. Another portion of the droplets directly fell down on such substrate, formed the granular aggregates thereon, and completed the polymerization. The water-absorbing polymer was thus immobilized on the substrate through such complexation processes. The water content of the water-absorbing polymer thus immobilized on the substrate was found to be 45 wt %.

Such composite was sprayed with a 1 wt % aqueous solution of potassium persulfate (KPS) so as to attain an amount of KPS of 2,000 weight ppm relative to the immobilized polymer (on the dry polymer basis). The composite was then dried at 110° C. until the water content of the immobilized polymer is reduced to 20%.

Such composite was further sprayed with a 1 wt % ethanol solution of ethyleneglycol diglycidyl ether (EGDGE) so as to attain an amount of EGDGE of 3,000 weight ppm relative to the immobilized polymer (on the dry polymer basis). The composite sprayed with the EGDGE ethanol solution was then dried at 110° C. using a hot air drier until the water content of the immobilized polymer is reduced to 5%, to thereby obtain a water-absorbing composite having the polymer immobilized thereon in an amount of 200 g/m$^2$.

EXAMPLE 4

The water-absorbing composite was obtained by the similar procedures as in Example 3, except that the substrate (composite) having immobilized thereon the water-absorbing polymer with a water content of 45 wt % is sprayed with a 0.5 wt %, aqueous solution of sodium hydrogen sulfite (NaHSO$_3$) so as to attain an amount of NaHSO$_3$ of 1,000 weight ppm relative to the immobilized polymer (on the dry polymer basis).

EXAMPLE 5

Process steps up to the complexation step were conducted similarly to those in Example 1, to thereby obtain a substrate having immobilized thereon the water-absorbing polymer (composite) with a water content of 20 wt %.

The composite was then irradiated with ultraviolet radiation at an energy density of 1,000 mJ/cm$^2$, and was then sprayed with a 0.5 wt % ethanol solution of ethyleneglycol diglycidyl ether (EGDGE) so as to attain an amount of EGDGE of 3,000 weight ppm relative to the immobilized polymer (on the dry polymer basis). The composite sprayed with the EGDGE ethanol solution was then dried at 110° C. using a hot air drier until the water content of the immobilized polymer is reduced to 5%, to thereby obtain a water-absorbing composite having the polymer immobilized thereon in an amount of 200 g/m$^2$.

EXAMPLE 6

Process steps up to the complexation step were conducted similarly to those in Example 1, to thereby obtain a substrate having immobilized thereon the water-absorbing polymer with (composite) a water content of 20 wt %.

The composite was then irradiated under air atmosphere with electron beam at a dose of 20 megarad using an electron beam irradiation apparatus equipped with a Dynamitron accelerator, The composite was then sprayed with a 0.5 wt % ethanol solution of ethyleneglycol diglycidyl ether (EGDGE) so as to attain an amount of EGDGE of 3,000 weight ppm relative to the immobilized polymer (on the dry polymer basis). The composite sprayed with the EGDGE ethanol solution was then dried at 110° C. using a hot air drier until the water content of the immobilized polymer is reduced to 5, to thereby obtain a water-absorbing composite having the polymer immobilized thereon in an amount of 200 g/m$^2$.

EXAMPLE 7

Process steps up to the complexation step were conducted similarly to those in Example 3, to thereby obtain a substrate having immobilized thereon the water-absorbing polymer with a water content of 45 wt % (composite).

The composite was then immersed in 10 weight parts of a 30 wt % aqueous ethanol solution relative to one weight part of the immobilized polymer (on the dry polymer basis), and allowed to stand under the room temperature for 30 minutes. The composite was taken out from the ethanol solution and was then sprayed with a 0.5 wt % ethanol solution of ethyleneglycol diglycidyl ether (EGDGE) so as to attain an amount of EGDGE of 3,000 weight ppm relative to the immobilized polymer (on the dry polymer basis). The composite sprayed with the EGDGE ethanol solution was then dried at 110° C. using a hot air drier until the water content of the immobilized polymer is reduced to 5%, to thereby obtain a water-absorbing composite having the polymer immobilized thereon in an amount of 200 g/m$^2$.

EXAMPLE 8

Solutions "A" and "B" were prepared by the similar procedures as in Example 1.

Solutions "A" and "B" were then respectively heated to 40° C. and fed using pumps respectively to each of paired nozzles so as to be injected at a flow rate of 5 m/second, where the paired nozzles used herein has, as shown in FIG. 2, an inner diameter of 0.13 mm and are aligned at a crossing angle of 30° while keeping the distance between both nozzle ends of 4 mm.

Solutions "A" and "B" individually injected from each nozzle of the paired nozzles were combined, then fell together while keeping a form of a single liquid column of approx. 10 mm long, and then fell in a form of droplets through an ascending air flow (at 60° C.). the droplets were allowed fall onto the polyester-made, non-woven substrate (basis weight: 30 g/m$^2$) positioned 100 cm downward from the nozzle end, to thereby complete the polymerization on such substrate.

The water content of the water-absorbing polymer thus immobilized on the substrate was found to be 30 wt %. Such composite was then sprayed with a 0.5 wt % ethanol solution of ethyleneglycol diglycidyl ether (EGDGE) go as to attain an amount of EGDGE of 3,000 weight ppm relative to the immobilized polymer (on the dry polymer basis). The composite sprayed with the EGDGE ethanol solution was then dried at 110° C. using a hot air drier until the water content of the immobilized polymer is reduced to 5%, to thereby obtain a water-absorbing composite having the polymer immobilized thereon in an amount of 200 g/m².

EXAMPLE 9

Process steps up to the complexation step were conducted similarly to those in Example 3, to thereby obtain a substrate having immobilized thereon the water-absorbing polymer (composite) with a water content of 45 wt %.

The composite was then sprayed with a 0.5 wt % ethanol solution of ethyleneglycol diglycidyl ether (EGDGE) so as to attain an amount of EGDGE of 3,000 weight ppm relative to the immobilized polymer (on the dry polymer basis). The composite sprayed with the EGDGE ethanol solution was then dried at 110° C. using a hot air drier until the water content of the immobilized polymer is reduced to 5%, to thereby obtain a water-absorbing composite having the polymer immobilized thereon in an amount of 200 g/m².

EXAMPLE 10

Process steps up to the complexation step were conducted similarly to those in Example 1, to thereby obtain a substrate having immobilized thereon the water-absorbing polymer (composite) with a water content of 25 wt %.

The composite was dried at 110° C. using a hot air drier until the water content of the immobilized polymer is reduced to 5%, to thereby obtain a water-absorbing composite having the polymer immobilized thereon in an amount of 200 g/m². The resultant composite was then sprayed with a 0.5 wt % ethanol solution of ethyleneglycol diglycidyl ether (EGDGE) so as to attain an amount of EGDGE of 3,000 weight ppm relative to the immobilized polymer (on the dry polymer basis), to thereby obtain a water-absorbing composite having the polymer immobilized thereon in an amount of 200 g/m².

Comparative Example 1

Process steps up to the complexation step were conducted similarly to those in Example 1, to thereby obtain a substrate having immobilized thereon the water-absorbing polymer (composite) with a water content of 20 wt %.

The composite was dried until the water content of the immobilized polymer is reduced to 5%, to thereby obtain a water-absorbing composite having the polymer immobilized thereon in an amount of 200 g/m².

Comparative Example 2

In a 100-ml conical flask, 13.1 g of sodium hydroxide (purity=96 wt. %) was measured and dissolved in 39.0 g of water under cooling an ice. The resultant solution was neutralized by gradually adding 30 g of acrylic acid, to thereby attain a degree of neutralization of approx. 75% and a monomer concentration In the aqueous solution of approx. 45 wt %.

Potassium persulfate as a radical polymerization initiator was then weighed as much as 0.05 g, dissolved into the above monomer solution, and the solution was deaerated with $N_2$.

Separately the polyester-made, non-woven fabric (basis weight; 30 g/m²) was weighed as much as 0.583 g, and the above aqueous solution of monomer was coated over the entire surface thereof using a roll coater, which results in immersion of the monomer in a filamentous pattern along the fibers. The amount of the immersed monomer was 6.8 times heavier than the non-woven fabric. The non-woven fabric was placed in a thermostatic chamber previously deaerated with $N_2$ and conditioned at 90° C. The polymerization started immediately, which successfully resulted in a composite which comprises the polyester non-woven fabric, having stably immobilized thereon in a filamentous pattern along the fibers thereof, the water-absorbing polymer composed of self-crosslinked product of partially-neutralized sodium polyacrylate.

Next, the water content of such composite was adjusted to approx. 25 wt % (on the basis of weight of the water-absorbing polymer, the same will apply hereinafter), 0.012 g of ethyleneglycol diglycidyl ether (3,000 ppm relative to dry polymer) was sprayed thereto in a form of a 0.5 wt % ethanol solution, dried at 110° C. using a hot air drier so as to reduce the water content of the immobilized polymer to 5%, to thereby obtain a water-absorbing composite having the polymer immobilized thereon in an amount of 200 g/m².

Test Examples

The individual water-absorbing composites obtained in Examples 1 to 10 and Comparative Examples 1 and 2 were subjected to measurements and tests described below.

(1) Ratio of Polymer Forming Granular Aggregates

The water-absorbing composite was photographed under a scanning electron microscope (SEM) at a plurality of observational points, and 100 particles were randomly selected to determine whether the aggregation is observed or not. Assuming that the density of the granular aggregates are homogeneous, ratio of the polymer forming such granular aggregates was calculated.

(2) Average Grain Size of Granular Aggregates

From SEM photographs taken at a plurality of observational points, 100 particles were randomly selected for measurement of the grain size, and an average value of such measured grain size was determined.

(3) Polymerization Ratio as Fallen onto Substrate

A beaker containing an accurately weighed methanol was placed while adjusting the liquid level thereof to the actual level of the substrate, so as to allow the granular aggregates, which were produced in the droplets of the polymerizing reaction mixture in the gas phase, to fall into such beaker while keeping the state on the halfway of the polymerization. The amount of monomer in methanol was measured by liquid chromatography, The methanol was also dried under reduced pressure at 130° C. for 3 hours, and the residual polymer was weighed. Polymerization ratio was then calculated using such measured weights based on the following equation (where, Mp represents weight of polymer, and Mn represents weight of monomer expressed in gram):

$$\text{Polymerization ratio} = \frac{Mp}{Mn + Mp} \times 100$$

(4) Physiological Saline Absorption Property

Approx. 1.0 g of the water-absorbing composite and 200 g of a 0.9% saline were individually weighed and placed in a 300-ml beaker, and allowed to stand for approx. 4 hours to thereby sufficiently swell the polymer with the saline, The excessive saline was removed on a 100-mesh screen, and physiological saline absorption property was estimated according to the equation below, where all weights in the equation are expressed in gram:

$$\text{Physiological saline absorption property} = \frac{\text{Weight of water-absorbed absorbing composite} - \text{Weight of water-absorbed substrate}}{\text{Weight of water-absorbing polymer immobilized on water-absorbing composite}}$$

"Weight of water-absorbed substrate" is weight of water-absorbed non-woven fabric having no water-absorbing polymer immobilized thereon cut into the same size as the non-woven fabric composing the water-absorbing composite.

(5) Physiological Saline Retention Property

A sample strip of the composite was cut out so that the weight of water-absorbing polymer $W_1$ immobilized thereon will be 1 g, enclosed in a nylon bag of 250 mesh (20 cm×10 cm), and immersed into 500 ml of saline (with a 0.9 wt % concentration) at the room temperature for 30 minutes. The nylon bag was then drawn out, hung for 15 minutes to remove excessive water, and then centrifuged at 90 G for 90 seconds for further dewatering. The weight of the dewatered nylon bag $W_2$ was measured. The non-woven fabric having no water-absorbing polymer immobilized thereon was cut into the same size, similarly processed to obtain the weight $W_3$. The physiological saline retention property was estimated according to the equation below, where all weights $W_1$ to $W_3$ in the equation are expressed in gram:

$$\text{Physiological saline retention property} = \frac{W_2 - W_3}{W_1}$$

(6) Water Absorption Speed Under Normal Pressure

Approx. 1.0 g of the water-absorbing composite and 200 g of a 0.9% saline were individually weighed and placed in a 300-ml beaker, and allowed to stand for 5 minutes to thereby swell the polymer with the saline. The excessive saline was removed on a 100-mesh screen, and physiological saline absorption property was estimated according to the above equation.

(7) Water Absorption Speed Under Pressure

Figure 3:
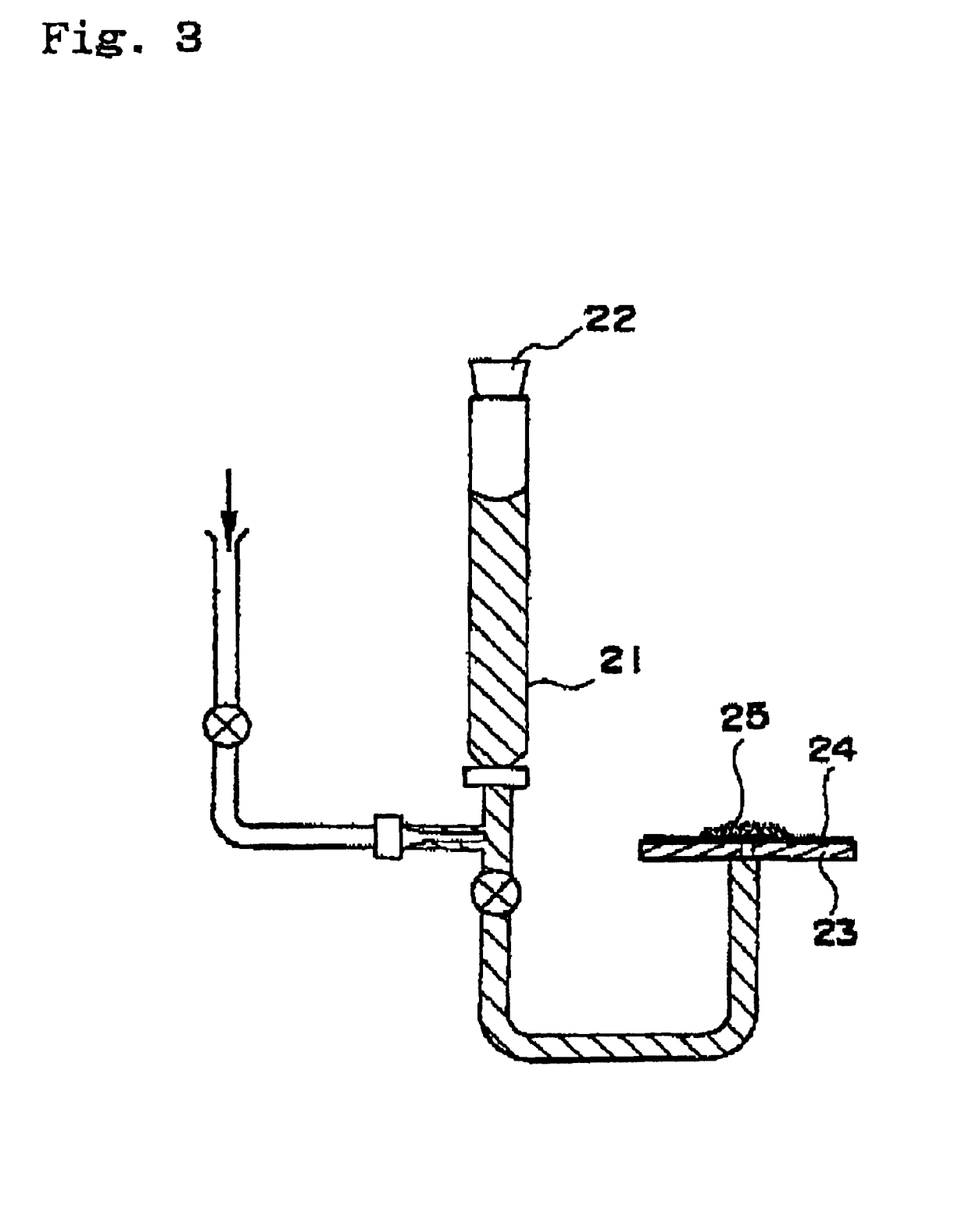
FIG. 3 is a schematic sectional view showing an instrument for measuring water absorption speed under pressure used in a Test Example.

The water absorption speed under pressure was measured using a measurement instrument shown in FIG. 3 and physiological saline in compliance with JIS K-7224. The composite previously cut into 10 cm×10 cm was placed on a non-woven fabric laid on a pierced support plate so that the immobilized water-absorbing polymer is directed upward, and was further covered with another non-woven fabric same as that placed on the support plate. A predetermined weight is placed thereon to thereby apply a predetermined pressure (40 g/cm$^2$ or 60 g/cm$^2$) to the composite. The bottom plane of the composite is then brought into contact with a 0.9% saline, and the amount of the physiological saline absorbed by the composite was measured. The water absorption speed under pressure was defined as the amount of the 0.9% saline absorbed within a period of 10 minutes, 20 minutes or 60 minutes after the start of the measurement, (8) Concentration of Residual Non-reacted Polymerizable Monomer The water-absorbing composite was precisely measured as much as 0.5 g, placed in a 2-litter beaker previously containing one litter of deionized water, and allowed to fully swell for approx. 10 hours. Thus swollen polymer gel was collected by filtration using a 200-mesh screen, and the filtrate was analyzed by high-performance liquid chromatography. Standard solutions having known concentrations were separately prepared to obtain an analytical curve, based on which the absolute concentration was determined.

The results were shown in Table 1 below.

TABLE 1

| | Example | | | | | | | | | | Comparative Example | |
|---|---|---|---|---|---|---|---|---|---|---|---|---|
| | 1 | 2 | 3 | 4 | 5 | 6 | 7 | 8 | 9 | 10 | 1 | 2 |
| Water absorption ratio after complexation | 20 | 20 | 45 | 45 | 20 | 20 | 45 | 30 | 45 | 20 | 20 | — |
| Water absorption ratio before surface crosslinking | 20 | 20 | 20 | 20 | 20 | 20 | (20) | 30 | 45 | 5 | no surface crosslink | 25 |
| Polymerization ratio as fallen onto substrate | 82 | 82 | 80 | 80 | 82 | 82 | 80 | 15 | 80 | 82 | 82 | 0 |
| Ratio of granular aggregates | 85 | 85 | 85 | 85 | 85 | 85 | 85 | 0 | 85 | 85 | 85 | — |
| Average grain size of granular aggregates | 550 | 550 | 550 | 550 | 550 | 550 | 550 | 200 | 550 | 550 | 550 | no particle |
| Physiological saline absorption property (4h) | 38 | 38 | 37 | 37 | 37 | 36 | 38 | 34 | 32 | 39 | 40 | 37 |
| Physiological saline retention property | 35 | 35 | 35 | 35 | 35 | 34 | 35 | 32 | 28 | 36 | 37 | 35 |
| Water absorption speed under normal pressure (5 min) | 32 | 32 | 31 | 31 | 32 | 31 | 32 | 26 | 30 | 30 | 30 | 30 |
| Water absorption speed under pressure 40 g/cm$^2$ | | | | | | | | | | | | |
| 10 min | 17 | 18 | 17 | 18 | 18 | 18 | 18 | 13 | 14 | 11 | 9 | 11 |
| 20 min | 20 | 21 | 20 | 20 | 21 | 21 | 20 | 15 | 16 | 13 | 11 | 13 |
| 60 min | 27 | 28 | 27 | 26 | 27 | 27 | 26 | 17 | 19 | 15 | 13 | 15 |
| 60 g/cm$^2$ | | | | | | | | | | | | |
| 10 min | 15 | 15 | 15 | 15 | 15 | 15 | 15 | 12 | 12 | 10 | 8 | 10 |
| 20 min | 18 | 18 | 18 | 17 | 18 | 18 | 17 | 14 | 14 | 12 | 10 | 12 |
| 60 min | 24 | 25 | 25 | 23 | 24 | 24 | 23 | 16 | 17 | 14 | 11 | 13 |
| 40 g/cm$^2$ + 60 g/cm$^2$ | | | | | | | | | | | | |

TABLE 1-continued

|  | Example | | | | | | | | | | Comparative Example | |
|---|---|---|---|---|---|---|---|---|---|---|---|---|
|  | 1 | 2 | 3 | 4 | 5 | 6 | 7 | 8 | 9 | 10 | 1 | 2 |
| 10 min | 32 | 33 | 32 | 33 | 33 | 33 | 33 | 25 | 26 | 21 | 17 | 21 |
| 20 min | 38 | 39 | 38 | 37 | 39 | 39 | 37 | 29 | 30 | 25 | 21 | 25 |
| 60 min | 51 | 53 | 52 | 49 | 51 | 51 | 49 | 33 | 36 | 29 | 24 | 28 |
| Concentration of residual monomer | 140 | 80 | 90 | 50 | 60 | 40 | 80 | 180 | 130 | 140 | 150 | 2000 |

All of the water-absorbing composites produced according to the continuous production method as described in Examples 1 to 10 were found to show satisfiable levels of physiological saline absorption property, water retention property, water absorption speed under normal pressure, water absorption speed under pressure and residual monomer content. In particular, the water-absorbing composite of Examples 1 to 7 showed excellent effects. On the contrary, the water-absorbing composite of Comparative Examples 1 and 2 were found to be in particular poor in the water absorption speed under pressure, which were not judged as satisfiable.

Industrial Applicability

The present invention can produce a water-absorbing composite excellent in water absorption property and water retention property in a continuous and highly efficient manner. The water-absorbing composite produced by the production method of the present invention is preferably used for producing so-called water-absorbing articles such as paper diaper and sanitary napkin.

The entire contents of each of PCT/JP00/01601, filed Mar. 16, 2000 and JP 11-069837, filed Mar. 16, 1999, is incorporated by reference.

What is claimed is:

1. A continuous method for the production of a water-absorbing composite, comprising:
   complexing to produce a particle-substrate composite by dropwisely supplying an aqueous solution of polymerizable monomers consisting mainly of an unsaturated carboxylic acid where 20% or more of the carboxyl groups in the unsaturated acid are neutralized, while allowing polymerization to proceed in the droplets, onto a fibrous substrate fed to the drop point to allow the incompletely polymerized polymer particles to adhere thereon, and completing the polymerization thereafter;
   reducing the water content of the polymer particles composed of the particle-substrate composite within a range from 10 to 40 wt % by bringing the particle-substrate composite into contact with a hydrophilic organic solvent; and
   surface crosslinking the composite with a crosslinking agent, having two or more functional groups capable of reacting with a carboxyl group and/or carboxylate group, in the presence of 1 to 100 weight parts of water per 100 weight parts of polymer particles derived from the polymerizable monomer contained in the composite.

2. The continuous method as claimed in claim 1, further comprising, posterior to the complexing, processing the polymerizable monomer remaining in the polymer particles composed of the particle-substrate composite.

3. The continuous method as claimed in claim 1, wherein the unsaturated carboxylic acid is acrylic acid.

4. The continuous method as claimed in claim 3, wherein 20% or more of carboxyl groups of the acrylic acid is neutralized in the form of an alkaline metal salt or an ammonium salt.

5. The continuous method as claimed in claim 1, wherein the polymerization of the aqueous solution of polymerizable monomer in the complexing is initiated by a redox-type polymerization initiator.

6. The continuous method as claimed in claim 5, wherein the droplets in the complexing are formed by mixing, in the gas phase, a first solution containing an oxidizing agent as one component of the redox-type polymerization initiator and the aqueous solution of polymerizable monomer, and a second solution containing a reducing agent as another component of the redox-type polymerization initiator and the aqueous solution of polymerizable monomer.

7. The continuous method as claimed in claim 6, wherein the first solution in a form of liquid column and the second solution in a form of liquid column are mixed by collision.

8. The continuous method as claimed in claim 1, wherein the polymerization ratio of the polymerizable monomer at the time of the contact with the fibrous substrate is within a range from 20 to 97%.

9. The continuous method as claimed in claim 1, wherein at least a part of the polymer particles of the particle-substrate composite obtained in the complexing forms granular aggregates in which the polymer particles are bound with each other, and a part of the polymer particles composed of the granular aggregates is not directly bound to the fibrous substrate.

10. The continuous method as claimed in claim 9, wherein the polymer particles composed of the granular aggregates account for 30 wt % or more of the total polymer particles.

11. The continuous method as claimed in claim 9, wherein the particle size of the granular aggregates is within a range from 100 to 3,000 μm.

12. The continuous method as claimed in claim 1, wherein the polymer particles are immobilized on the fibrous substrate in an amount of 50 to 400 g/m$^2$ in the complexing.

13. The continuous method as claimed in claim 1, wherein the crosslinking agent is a compound having glycidyl groups as the groups capable of reacting with the carboxyl group and/or the carboxylate group.

14. The continuous method as claimed in claim 13, wherein the compound having glycidyl groups is a polyglycidyl ether.

15. The continuous method as claimed in claim 1, wherein the crosslinking agent is sprayed over the particle-substrate composite in a form of aqueous solution or alcoholic solution.

16. The continuous method as claimed in claim 2, wherein the residual monomer content of the particles is reduced by heating the particle-substrate composite at 100 to 250° C.

17. The continuous method as claimed in claim 2, wherein the residual monomer content of the polymer particles is reduced by heating the particle-substrate composite after being added with a peroxide and/or azo compound in an amount of 0.01 to 1 weight parts per 100 weight parts of the polymer particles in the particle-substrate composite.

18. The continuous method as claimed in claim 2, wherein the residual monomer content of the polymer particles is by irradiating the particle-substrate composite with ultraviolet radiation.

19. The continuous method as claimed in claim 2, wherein the residual monomer content of the polymer particles is reduced by irradiating the particle-substrate composite with an electromagnetic radioactive ray or particulate ionized radioactive ray.

20. The continuous method as claimed in claim 2, wherein the residual monomer content of the polymer particles is reduced by heating the particle-substrate composite after adding a reducing agent in an amount of 0.1 to 20 weight parts per 100 weight parts of the polymer particles in the particle-substrate composite.

21. The continuous method as claimed in claim 2, wherein the residual monomer content of the polymer particles is reduced by bringing the particle-substrate composite into contact with a water-containing organic solvent capable of solubilizing the polymerizable monomer to thereby extract the polymerizable monomer contained in the composite into the water-containing organic solvent.

22. The continuous method as claimed in claim 21, wherein the water-containing organic solvent is any one of water-containing methanol, water-containing ethanol, water-containing acetone or mixtures thereof.

23. The continuous method as claimed in claim 1, wherein the fibrous substrate comprises a non-woven fabric.

24. The continuous method as claimed in claim 23, wherein the non-woven fabric comprises fibers having a diameter of 10 to 50 $\mu$m.

25. The continuous method as claimed in claim 23, wherein the non-woven fabric has a basis weight of 10 to 100 g/m$^2$.

26. The continuous method as claimed in claim 1, wherein the hydrophilic organic solvent is any one of ethanol, methanol, acetone and mixtures thereof, all of which having a water content of 30 wt % or below.

27. The continuous method as claimed in claim 26, further comprising, posterior to the complexing, processing the polymerizable monomer remaining in the polymer particles composed of the particle-substrate composite.

28. The continuous method as claimed in claim 27, wherein the complexing, surface crosslinking and processing are conducted in that order.

29. The continuous method as claimed in claim 27, wherein the complexing, processing and surface crosslinking are conducted in that order.

30. The continuous method as claimed in claim 27, wherein the complexing, processing, reducing and surface crosslinking are conducted in that order.

31. The continuous method as claimed in claim 27, wherein the complexing, reducing, surface crosslinking and processing are conducted in that order.

32. The continuous method as claimed in claim 27, wherein the complexing, reducing, processing and surface crosslinking are conducted in that order.

33. The continuous method as claimed in claim 26, wherein the unsaturated carboxylic acid is acrylic acid.

34. The continuous method as claimed in claim 33, wherein 20% or more of the carboxyl groups of the acrylic acid is neutralized in a form of an alkaline metal salt or ammonium salt.

35. The continuous method as claimed in claim 26, wherein the polymerization of the aqueous solution of the polymerizable monomer in the complexing is initiated by a redox-type polymerization initiator.

36. The continuous method as claimed in claim 35, wherein the droplets in the complexing are formed by mixing, in the gas phase, a first solution containing an oxidizing agent as one component of the redox-type polymerization initiator and the aqueous solution of polymerizable monomer, and a second solution containing a reducing agent as another component of the redox-type polymerization initiator and the aqueous solution of polymerizable monomer.

37. The continuous method as claimed in claim 36, wherein the first solution in a form of liquid column and the second solution in a form of liquid column are mixed by collision.

38. The continuous method as claimed in claim 26, wherein the polymerization ratio of the polymerizable monomer at the time of the contact with the fibrous substrate is within a range from 20 to 97%.

39. The continuous method as claimed in claim 26, wherein at least a part of the polymer particles of the particle-substrate composite obtained in the complexing forms granular aggregates in which the polymer particles are bound with each other, and a part of the polymer particles composed of the granular aggregates is not directly bound to the fibrous substrate.

40. The continuous method as claimed in claim 39, wherein the polymer particles composed of the granular aggregates account for 30 wt % or more of the total polymer particles.

41. The continuous method as claimed in claim 39, wherein the particle size of the granular aggregates is within a range from 100 to 3,000 $\mu$m.

42. The continuous method as claimed in claim 26, wherein the polymer particles are immobilized on the fibrous substrate in an amount of 50 to 400 g/m$^2$ in the complexing.

43. The continuous method as claimed in claim 26, wherein the crosslinking agent is a compound having glycidyl groups as the groups capable of reacting with the carboxyl group and/or carboxylate group.

44. The continuous method as claimed in claim 43, wherein the compound having glycidyl groups is a polyglycidyl ether.

45. The continuous method as claimed in claim 26, wherein the crosslinking agent is sprayed over the particle-substrate composite in a form of aqueous solution or alcoholic solution.

46. The continuous method as claimed in claim 27, wherein the residual monomer content of the polymer particles is reduced in the processing by heating the particle-substrate composite at 100 to 250° C.

47. The continuous method as claimed in claim 27, wherein the residual monomer content of the polymer particles is reduced in the processing by heating the particle-substrate composite after being added with a peroxide and/or azo compound in an amount of 0.01 to 1 weight parts per 100 weight parts of the polymer particles in the particle-substrate composite.

48. The continuous method as claimed in claim 27, wherein the residual monomer content of the polymer particles is reduced in the processing by irradiating the particle-substrate composite with ultraviolet radiation.

49. The continuous method as claimed in claim 27, wherein the residual monomer content of the polymer particles is reduced in the processing by irradiating the particle-substrate composite with an electromagnetic radioactive ray or particulate ionized radioactive ray.

50. The continuous method as claimed in claim 27, wherein the residual monomer content of the polymer particles is reduced in the processing by heating the particle-substrate composite after adding a reducing agent in an amount of 0.1 to 20 weight parts per 100 weight parts of the polymer particles in the particle-substrate composite.

51. The continuous method as claimed in claim 27, wherein the residual monomer content of the polymer particles is reduced in the processing by bringing the particle-substrate composite into contact with a water-containing organic solvent capable of solubilizing the polymerizable monomer to thereby extract the polymerizable monomer contained in the composite into the water-containing organic solvent.

52. The continuous method as claimed in claim 27, wherein the water-containing organic solvent is any one of water-containing methanol, water-containing ethanol, water-containing acetone or mixtures thereof.

53. The continuous method as claimed in claim 27, wherein the particle-substrate composite is contacted with a superheated steam or steam-containing gas conditioned at a temperature of 80 to 250° C. and at a dew point of 50 to 250° C. in the processing.

54. The continuous method as claimed in claim 26, wherein the fibrous substrate comprises a non-woven fabric.

55. The continuous method as claimed in claim 54, wherein the non-woven fabric comprises fibers having a diameter of 10 to 50 $\mu$m.

56. The continuous method as claimed in claim 54, wherein the non-woven fabric has a basis weight of 10 to 100 g/m$^2$.

57. A water-absorbing composite produced by the method of claim 1.

58. A continuous method for the of a water-absorbing composite, comprising:
 complexing to produce a particle-substrate composite by dropwisely supplying an aqueous solution of polymerizable monomers consisting mainly of an unsaturated carboxylic acid where 20% or more of the carboxyl groups in the unsaturated acid are neutralized, while allowing polymerization to proceed in the droplets, onto a fibrous substrate fed to the drop point to allow the incompletely polymerized polymer particles to adhere thereon, and completing the polymerization thereafter;
 reducing the content of the polymerizable monomer remaining in the polymer particles composed of the particle-substrate composite by bringing the particle-substrate composite into contact with a water-containing organic solvent capable of solubilizing the polymerizable monomer to thereby extract the polymerizable monomer contained in the composite into the water-containing organic solvent; and
 a surface crosslinking the composite with a crosslinking agent, having two or more functional groups capable of reacting with a carboxyl group and/or carboxylate group, in the presence of 1 to 100 weight parts of water per 100 weight parts of polymer particles derived from the polymerizable monomer contained in the composite.

59. The continuous method as claimed in claim 58, wherein water content of the polymer particles composed of the particle-substrate composite subjected to the surface crosslinking is within a range from 10 to 40 wt %.

60. The continuous method as claimed in claim 58, wherein the unsaturated carboxylic acid is acrylic acid.

61. The continuous method as claimed in claim 58, wherein the polymerization of the aqueous solution of polymerizable monomer in the complexing is initiated by a redox-type polymerization initiator.

62. The continuous method as claimed in claim 58, wherein the polymerization ratio of the polymerizable monomer at the time of the contact with the fibrous substrate is within a range from 20 to 97%.

63. The continuous method as claimed in claim 58, wherein at least a part of the polymer particles of the particle-substrate composite obtained in the complexing forms granular aggregates in which the polymer particles are bound with each other, and a part of the polymer particles composed of the granular aggregates is not directly bound to the fibrous substrate.

64. The continuous method as claimed in claim 58, wherein the polymer particles are immobilized on the fibrous substrate in an amount of 50 to 400 g/m$^2$ in the complexing.

65. The continuous method as claimed in claim 58, wherein the crosslinking agent is a compound having glycidyl groups as the groups capable of reacting with the carboxyl group and/or carboxylate group.

66. The continuous method as claimed in claim 58, wherein the crosslinking agent is sprayed over the particle-substrate composite in a form of aqueous solution or alcoholic solution.

67. The continuous method as claimed in claim 59, wherein the water content of the polymer particles is reduced by heating the particle-substrate composite.

68. The continuous method as claimed in claim 59, wherein the residual monomer content of the polymer particles is reduced by heating the particle-substrate composite at 100 to 250° C.

69. The continuous method as claimed in claim 59, wherein the residual monomer content of the polymer particles is reduced by heating the particle-substrate composite after being added with a peroxide and/or azo compound in an amount of 0.01 to 1 weight parts per 100 weight parts of the polymer particles in the particle-substrate composite.

70. The continuous method as claimed in claim 59, wherein the residual monomer content of the polymer particles is reduced by irradiating the particle-substrate composite with ultraviolet radiation.

71. The continuous method as claimed in claim 59, wherein the residual monomer content of the polymer particles is reduced by irradiating the particle-substrate composite with an electromagnetic radioactive ray or particulate ionized radioactive ray.

72. The continuous method as claimed in claim 59, wherein the residual monomer content of the polymer particles is reduced by heating the particle-substrate composite after adding a reducing agent in an amount of 0.1 to 20 weight parts per 100 weight parts of the polymer particles in the particle-substrate composite.

73. The continuous method as claimed in claim 59, wherein the particle-substrate composite is contacted with a superheated steam or steam-containing gas conditioned at a temperature of 80 to 250° C. and at a dew point of 50 to 250° C. in the processing.

74. The continuous method as claimed in claim 59, wherein the fibrous substrate comprises a non-woven fabric.

75. The continuous method of claim 58, wherein the water-containing organic solvent is any one of water-containing methanol, water-containing ethanol, water-containing acetone or mixtures thereof.

76. The continuous method as claimed in claim 75, wherein the residual monomer content of the polymer particles is reduced in the processing by irradiating the particle-substrate composite with an electromagnetic radioactive ray or particulate ionized radioactive ray.

77. The continuous method as claimed in claim 75, wherein the residual monomer content of the polymer particles is reduced in the processing by heating the particle-substrate composite after adding a reducing agent in an amount of 0.1 to 20 weight parts per 100 weight parts of the polymer particles in the particle-substrate composite.

78. The continuous method as claimed in claim 75, wherein the particle-substrate composite is contacted with a superheated steam or steam-containing gas conditioned at a temperature of 80 to 250° C. and at a dew point of 50 to 250° C. in the processing.

79. The continuous method as claimed in claim 75, wherein the fibrous substrate comprises a non-woven fabric.

80. The continuous method as claimed in claim 79, wherein the non-woven fabric comprises fibers having a diameter of 10 to 50 μm.

81. The continuous method as claimed in claim 79, wherein the non-woven fabric has a basis weight of 10 to 100 g/m$^2$.

82. A water-absorbing composite produced by the method of claim 58.

* * * * *